UNITED STATES PATENT OFFICE.

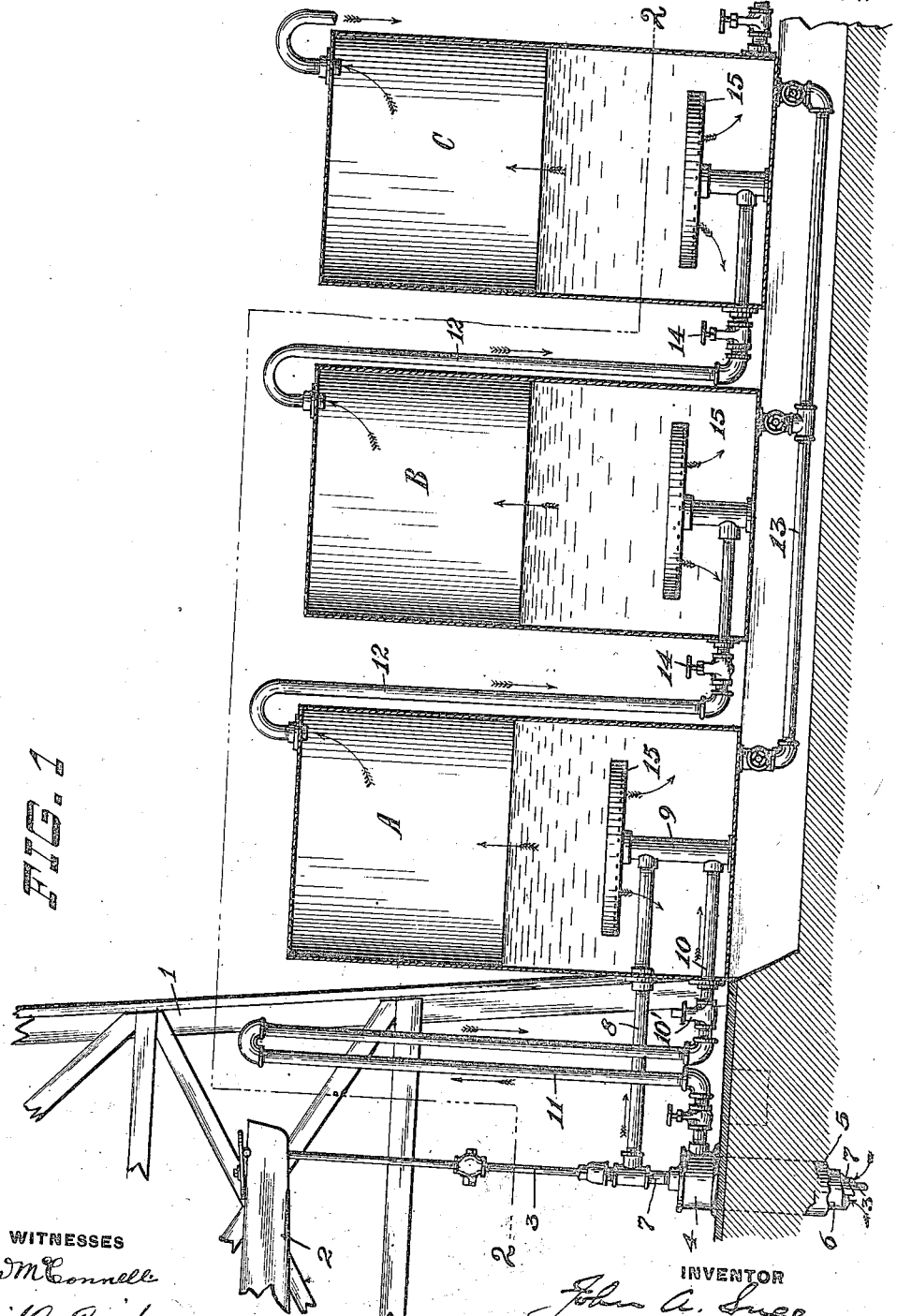

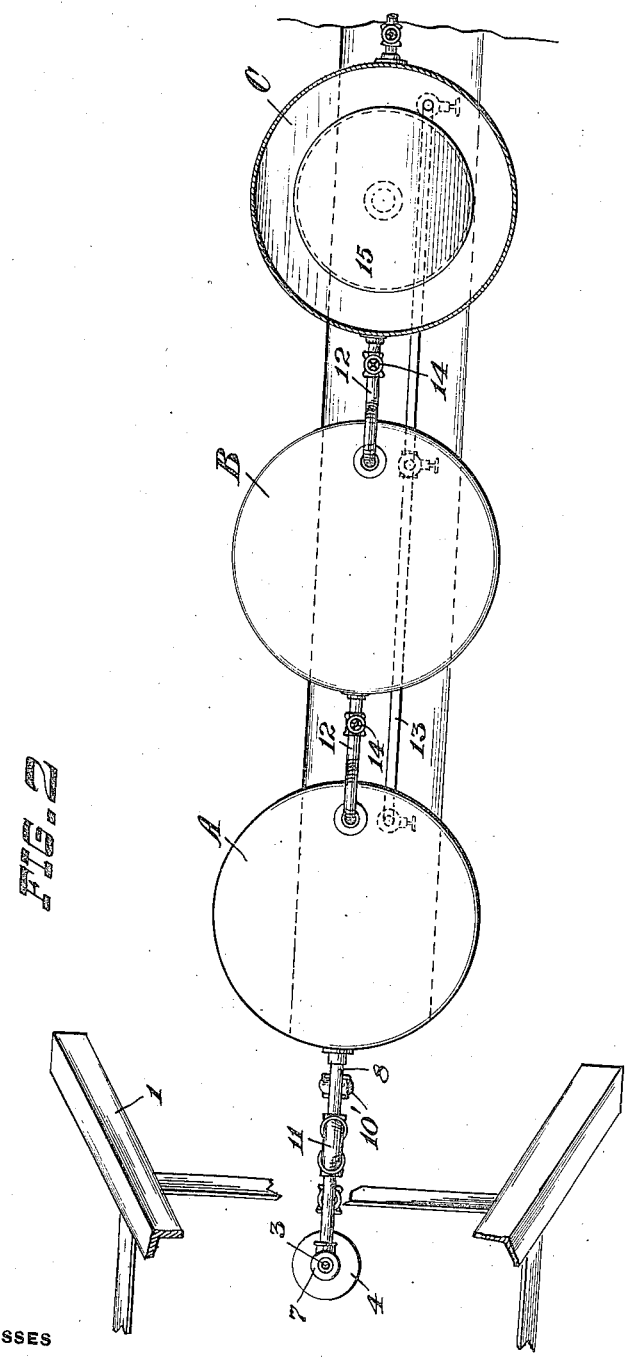

JOHN A. SNEE, OF WEST ELIZABETH, PENNSYLVANIA, ASSIGNOR TO FRANK SNEE, OF WEST ELIZABETH, PENNSYLVANIA.

PROCESS FOR RETAINING THE LIGHTER OR MORE VOLATILE OILS CONTAINED IN THE PRODUCT OF OIL-WELLS, &c.

1,165,458.

Specification of Letters Patent. Patented Dec. 28, 1915.

Application filed February 15, 1911. Serial No. 608,827.

*To all whom it may concern:*

Be it known that I, JOHN A. SNEE, a resident of West Elizabeth, in the county of Allegheny and State of Pennsylvania, have invented certain new and useful Improvements in Processes for Retaining the Lighter or More Volatile Oils Contained in the Product of Oil-Wells, &c., of which the following is a specification.

The primary object of this invention is to provide for the retention of the lighter or more volatile oils contained in the product of oil wells, gas wells, and wells which produce both oil and gas. Under present practices incident to pumping and storing oil a large amount of these substances escapes to the atmosphere and is entirely wasted. With wells which produce only gas the substances which I recover and preserve are by-products which are now ordinarily consumed with the gas, the result being that much valuable material is wasted, or at least consumed in a way in which its greatest value is not utilized. The method of recovering the lighter and more volatile substances to which the present invention is directed may thus be utilized in connection with so-called natural gas, without regard to whether petroleum is present or absent in the well which produces such gas. Or the invention may be utilized in the recovery and retention of volatile products given off by petroleum flowing or pumped from wells; also the lighter separable oils in the form of gas or gaseous vapor separated from the oil in an oil producing well.

It is common practice to discharge the product of oil wells, whether flowing or pumping wells, into large open tanks. Much of the volatile matter escapes and in time the surface of the ground and objects more or less close to such open tanks become saturated with an oily deposit. The products thus scattered and lost are valuable substances. By the present invention this waste is obviated to the extent of retaining and preserving practically all of the more volatile substances.

The volatile substances which it is the aim of the present invention to retain and preserve are, generally stated, all the oils boiling between 30° C. and 150° C., some of them being cymogen, petroleum ether, gasolene, ligroin and naphtha, as well as such kerosene as is mechanically carried into the air. Some or all of these substances thus preserved are present in crude petroleum as it emerges from the rock, and also in oil well gas, and to some extent in gas obtained from wells which produce no oil.

As it is the primary purpose of the present invention to provide for the efficient retention and preservation of the products heretofore wasted, I am not concerned at present with the separation of the lighter oils or substances one from another, and hence in practising the method, I prefer to use an absorbent that will effectively retain the several substances and from which those substances may be subsequently removed by distillation or other processes. As crude petroleum is the natural carrier or absorbent for all of these substances, the invention is preferably practised in such way as to cause the substances to be absorbed by petroleum, and preferably crude petroleum, so that all may be properly segregated by the ordinary refining processes to which such petroleum is subjected. However, the invention is not confined to the use of crude petroleum as, for instance, in practising the same by a series process, as hereinafter explained, wherein the lighter oils are mingled with and retained by crude petroleum as the result of a series of absorption processes, the last stage may be accomplished with an absorbent which is low in volatile substances, for instance petroleum from which the gasolene has been distilled. And it will be understood that partially refined petroleum, or any other suitable absorbent, may be used instead of crude petroleum in any or all of the stages without departing from the invention.

In the accompanying drawings, Figure 1 is a view partly in section and partly in elevation of apparatus which may be used in connection with an oil and gas producing well for practising the invention, and Fig. 2 is a sectional plan on line 2—2 of Fig. 1.

In the apparatus thus illustrated, 1 designates an ordinary well derrick, and 2 a walking beam for operating the pump rods 3 in usual manner.

4 is the casing head of the well, 5 the dry pipe, 6 the casing, and 7 the tubing through which rods 3 operate.

The pumped oil discharges through pipe 8 into a closed tank or receiver A, but instead of entering directly, pipe 8 is connected to the tubular stem 9 of the hollow perforated head or spreader 15. The gas which flows from the well, through the space between casing 6 and tubing 7, is also preferably discharged into stem 9 through connection 10, and this connection may be provided with a vertical loop 11 which rises as high or higher than receiver A, and prevents the oil from backing through the gas line into the well. When the oil pressure in receiver A or in tubular stem 9 exceeds the forward pressure of the gas, a check valve 10' in pipe 10 closes and prevents the back-flow. In the latter case, when the gas outlet is closed, the gas discharges from the well through the pump, mingling with the oil discharging through pipe 8. In either case, the oil and gas discharge from the head or spreader 15 into the body of oil in container A, and the gas or gaseous vapor rising from the surface of this body is conducted through pipe 12 to the bottom of a second closed container B, entering the latter preferably through head or spreader 15 like that within container A. The lighter or more volatile substances which are not arrested or absorbed by the petroleum in container A are thus subjected to a second absorption which consists preferably of crude petroleum like that in the original container. The absorbent, i. e., the petroleum, in container A is under more or less agitation due to the inflow of the oil and gas from the well, and hence the escape of the volatile substances is more readily accomplished than if the petroleum were quiescent, as in container B. While the volatile substances which it is the purpose of the invention to retain pass from container A in considerable volume they are materially checked and absorbed in container B, and may be still further absorbed by similarly passing the volatile products from container B into a third container C. Obviously, this series process may be continued through a fourth or any desired additional number of containers that may be found necessary for removing practically all traces of the substances referred to from the gaseous discharge. If desired the last tank of the series may contain an absorbent that is normally free of the lighter substances, for instance gasolene, and thus have such a capacity for all the lighter oils passing thereinto in the form of gas or vapor as to absorb the same entirely and preclude all waste. This absorbent for the last container may be petroleum from which the gasolene has been distilled, or other suitable heavy oil.

The several containers may be in valved communication with each other through a manifold 13, and the gas conducting pipes may be valved at 14. By this means one or more of the containers may be isolated from the rest and its fluid contents removed, replenished, or subjected to any desired manipulation, such as drawing off the contents of any one container into one or another of the other containers.

While the term natural gas as used herein designates such gas as is emitted from gas wells, and from oil wells separate from the liquid oil, it will be understood that the term applies as well to such gas as may be mingled with the oil as the latter discharges from the well but subsequently separates therefrom either as a gas or gaseous vapor. Also, as here used such term includes the gaseous or vapor discharge from the surface of petroleum contained in tanks, whether received into the tanks directly from wells or otherwise. It is the intention primarily to utilize the crude petroleum from a well for absorbing the volatile products of such well, but the invention is not thus limited. Obviously, the petroleum or other suitable absorbent for use with gas from a well producing gas alone may be derived from any suitable source. And obviously, apparatus for practising the invention may be variously embodied and arranged.

I claim:—

1. The method herein described consisting in discharging all of the liquid and gaseous hydrocarbon products of an oil well into a liquid and gas container, and absorbing the gaseous hydrocarbons which accumulate within the container above the surface of the liquid.

2. The method herein described consisting in discharging all of the liquid and gaseous hydrocarbon products of an oil well into a liquid and gas container beneath the fluid level of the latter, and removing and absorbing the gaseous hydrocarbons released from the liquid within the container.

3. The method herein described consisting in discharging all of the oil from an oil well into an oil and gas container, passing the gaseous products of the well into the oil thus discharged beneath the surface of the latter, and removing and absorbing the gaseous products released from the surface of the oil.

In testimony whereof I affix my signature in presence of two witnesses.

JOHN A. SNEE.

Witnesses:
J. M. NESBIT,
ELLA MCCONNELL.